United States Patent [19]

Battrick

[11] 3,806,651

[45] Apr. 23, 1974

[54] ELECTRONIC SIGNALLING CIRCUIT FOR A COIN TELEPHONE

[75] Inventor: Peter Edward Battrick, Ottawa, Ontario, Canada

[73] Assignee: Bell-Northern Research Ltd., Ottawa, Ontario, Canada

[22] Filed: Mar. 6, 1973

[21] Appl. No.: 338,564

[52] U.S. Cl. .................................. 179/6.5, 194/1 N

[51] Int. Cl. .......................................... H04m 17/02

[58] Field of Search .................. 179/6.3 R, 6.4, 6.5; 194/8, 16, 1 N, 9 R

[56] References Cited

UNITED STATES PATENTS

| | | | |
|---|---|---|---|
| 3,423,533 | 1/1969 | LaBarge | 179/6.5 |
| 3,435,146 | 3/1969 | Busala et al. | 179/6.5 |
| 3,586,146 | 6/1971 | Heirbaut et al. | 194/16 |
| 3,344,898 | 10/1967 | Klinikowski | 194/1 N |

*Primary Examiner*—Kathleen H. Claffy
*Assistant Examiner*—Gerald Brigance
*Attorney, Agent, or Firm*—Frank Turpin

[57] ABSTRACT

The insertion of a coin into the telephone subset selectively sets a pair of bistable circuits which initialize the coin signalling circuit. A gating means enables an audio oscillator connected to the telephone line through a transmission gating circuit and a pulse generator which produces clock signals. A logic circuit decodes the outputs of a binary counter driven by the clock signals and the outputs of the bistable circuits to produce an output signal comprising a number of pulses, which are representative of the coin inserted into the telephone subset. The transmission gating circuit is responsive to this output signal for gating the audio signal from the oscillator to the telephone line whereby alternating current signal bursts are transmitted on the telephone line.

8 Claims, 5 Drawing Figures

ELECTRONIC SIGNALLING CIRCUIT FOR A COIN TELEPHONE

This invention relates generally to coin telephones and more particularly to an electronic signalling circuit for a coin telephone.

The most common prior art coin telephone signalling circuit takes the form of a mechanical coin sorting mechanism having gongs located in the path of each coin. The characteristic audible sound produced by these gongs is picked up and transmitted to the central office by carbon button transducers.

However, the necessity of introducing automatic accounting for coin phones has led to the requirement that a coin telephone signalling circuit be capable of providing a more precisely controlled digital signal which is more suitable for use with an automatic receiver. In such a system a coin of a predetermined value requires the coin signalling circuit to produce a coded signal representative of the value of the coin.

One of the existing systems for obtaining this coded signal uses a mechanical device, which includes a clockwork mechanism powered by an electric motor, to generate the correct number of pulses. An oscillator of a predetermined frequency is switched on and off by the clockwork mechanism to produce a predetermined code of tone bursts. However, such a system tends to be unreliable and to require frequency maintenance in addition to being expensive to manufacture.

The present invention provides a fully electronic circuit which is capable of performing all the required functions of a coin signalling circuit reliably and economically. In addition, this circuit may be powered from the telephone line and therefore does not require a separate circuit current power supply. Furthermore, since the circuit is totally electronic and uses semiconductor technology, it may be realized using integrated circuit technology almost in its entirety.

A number of novel circuit techniques have been used to realize the circuit of the invention. For example, the entire circuit is connected to the telephone line in parallel with the standard telephone subset hybrid network thereby making use of the equalization characteristics of the network to equalize the transmitted coded signal. Also, the oscillator circuits are only activated during a coin signalling cycle, thereby preventing interference with normal speech transmission and conserving power. In addition, the circuit provides a means of muting the receiver of the telephone subset during transmission of the coded signals. This is achieved through the use of capactive discharge circuits which prevent sudden current demands on the telephone circuit.

In accordance with the invention there is provided an electronic signalling circuit for a coin telephone subset comprising a pair of bistable circuits and switch means responsive to the insertion of a coin into the telephone subset for selectively triggering the bistable circuits. A switching means is responsive to the outputs of the bistable circuits for controlling the operation of a pulse generator for producing a clock signal and an oscillator for producing an alternative current signal. A logical circuit is responsive to the clock signal and to the outputs of the bistable circuits for producing an output signal comprising a predetermined number of pulses, the number of pulses being representative of the coin inserted into the telephone subset. A transmission gating means is responsive to the output signal from the logical circuit for gating the signal from the oscillator to the telephone line, whereby alternating current signal bursts are transmitted on the telephone line, the number of bursts being representative of the coin inserted into the telephone subset.

An example embodiment of the invention will now be described in conjunction with the accompanying drawings in which.

Figure 1:
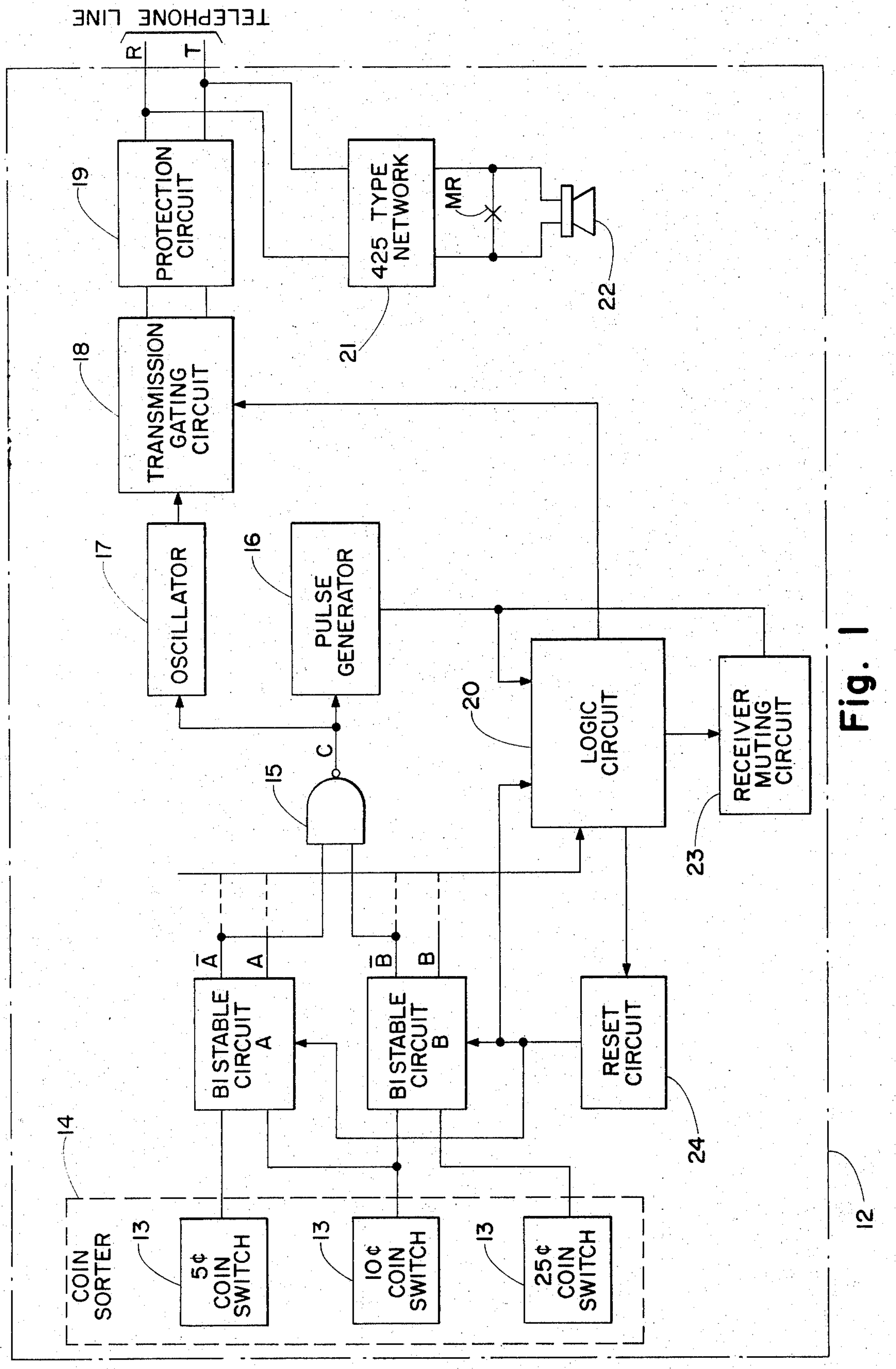
FIG. 1 is a block circuit diagram of a coin signalling circuit in accordance with the invention.

FIG. 1 shows a telephone subset 12 connected to a telephone line (Tip and Ring leads). A plurality of coin switches 13 which may be located in a coin sorter 14 are responsive to the insertion of coins having predetermined denominations into the coin sorter to selectively operate bistable circuits A and B. For example, the 5 cent coin switch is responsive to the insertion of a 5 cent coin to operate bistable circuit A. Similarly, the 10 cent coin switch is responsive to the insertion of a 10 cent coin to set bistable circuits A and B, and the 25 cent coin switch is responsive to the insertion of a 25 cent coin to set bistable circuit B. These coin switches may be microswitches located in the paths of the coins and adapted to be operable thereby. A switching means 15 is connected to respective outputs of the bistable circuits A and B and is responsive thereto to control the operation of a pulse generator 16 and an alternating current oscillator 17. The gating means 15 allows the pulse generator 16 and the oscillator 17 to function only during a coin cycle (waveform C in FIG. 5). Gating means 15 is shown to be a NAND gate, but it may be any type of gate capable of performing the function. The output of the oscillator 17 is connected to the telephone line through a transmission gating circuit 18 and a protection circuit 19. A logic circuit 20 is connected to the input of the pulse generator 16 and to the outputs of the bistable circuits A and B and is responsive thereto to control the operation of the transmission gating circuit 18. The pulse generator 16 may conveniently be a square-wave generator having a predetermined frequency, typically 15 Hz, and the oscillator 17 may be a sine-wave oscillator having a predetermined audio frequency, typically 2.2 KHz.

A standard telephone subset hybrid network 21 (such as type 425) is connected across the T and R leads of the telephone line. A receiver 22 which is normally part of the telephone handset is connected to the network 21 and a make-contact MR is connected across the leads from the network 21 to the receiver 22. It should be noted that the MR make-contact may be replaced with a break-contact connected in series with one of the leads connecting the network 21 to the receiver 22. Other well known portions of the subset such as the handset transmitter are not shown. A receiver muting circuit 23, which includes a muting relay (shown in FIG. 2) is responsive to outputs from the logic circuit 20 and pulse generator 16 to operate the MR make-contact, thereby to mute the receiver 22. A reset circuit 24 is responsive to outputs from logic circuit 20 and bistable circuits A and B to reset portions of the logic circuit 20 and bistable circuits A and B at the end of every coin cycle. Reset circuit 24 is also responsive to a subscriber going off-hook to provide a reset signal.

Figure 2:
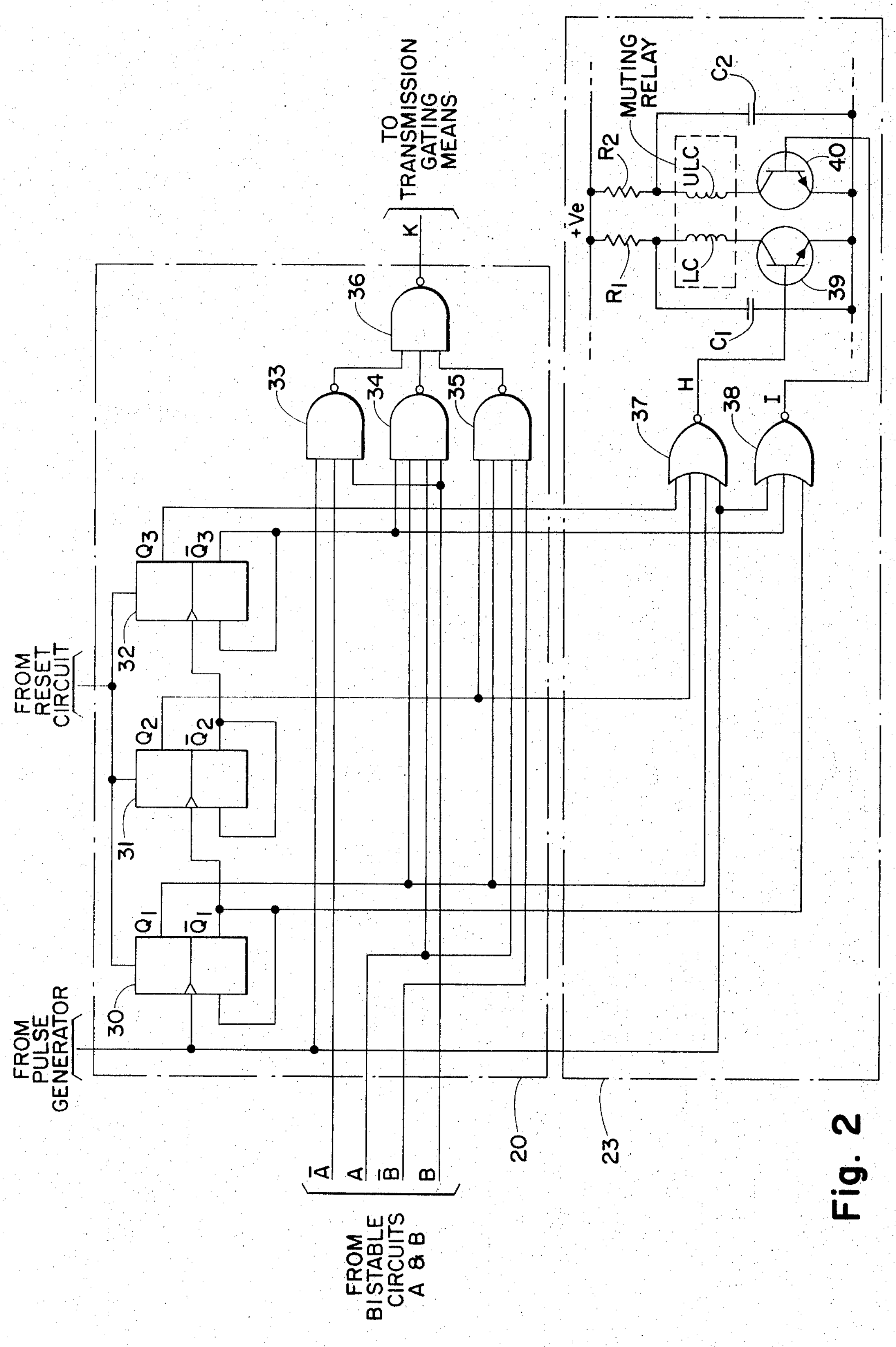
FIG. 2 is a logic circuit diagram of a first portion of the circuit shown in FIG. 1.

FIG. 2 is a logic circuit diagram of the logic circuit 20 and the receiver muting circuit 23 shown in FIG. 1. Bistable circuits 30, 31 and 32 form a three-stage binary counter responsive to the output from the pulse generator 16 to produce output signals on leads $Q_1$–$\overline{Q_1}$, $Q_2$–$\overline{Q_2}$ and $Q_3$–$\overline{Q_3}$. NAND gates 33 to 36 are logically connected to the outputs from the counter and from the bistable circuits A and B (leads A–$\overline{A}$ and B–$\overline{B}$) to produce an output signal (waveforms K in FIG. 5) for controlling the transmission gating circuit 18 of FIG. 1.

NOR gates 37 and 38 are logically connected to the outputs of the binary counter and to the output from the pulse generator 16 to produce muting and unmuting signals respectively. The output of gate 37 is connected to the base of transistor 39 which has its emitter connected to one side of the power supply and its collector connected to the other side of the power supply through an LC coil and a resistor $R_1$. The junction of the LC coil and resistor $R_1$ is connected to the first side of the power supply through a capacitor $C_1$. Similarly, the output of gate 38 is connected to the base of a transistor 40 having its emitter connected to the first side of the power supply and its collector connected to the other side of the power supply through a ULC coil and a resistor $R_2$. The junction of the ULC coil and resistor $R_2$ is connected to the first side of the power supply through a capacitor $C_2$. Coils LC and ULC are the latching and unlatching windings respectively of a muting relay which may be a reed relay. The MR make-contact shown connected across the leads of receiver 22 in FIG. 1 is operable by this relay. It should be noted that each of transistors 39 and 40 together with their respective circuitry comprises a capacitive discharge circuit. When the transistors 39 and 40 are turned OFF, capacitors $C_1$ and $C_2$ charge slowly through their respective resistor $R_1$ and $R_2$. When one of the transistors is turned ON, the related capacitor discharges through the related winding to latch or unlatch the relay. This circuit arrangement provides sudden current demands from the telephone line thereby precluding the creation of spikes thereon.

Figures 3, 4:
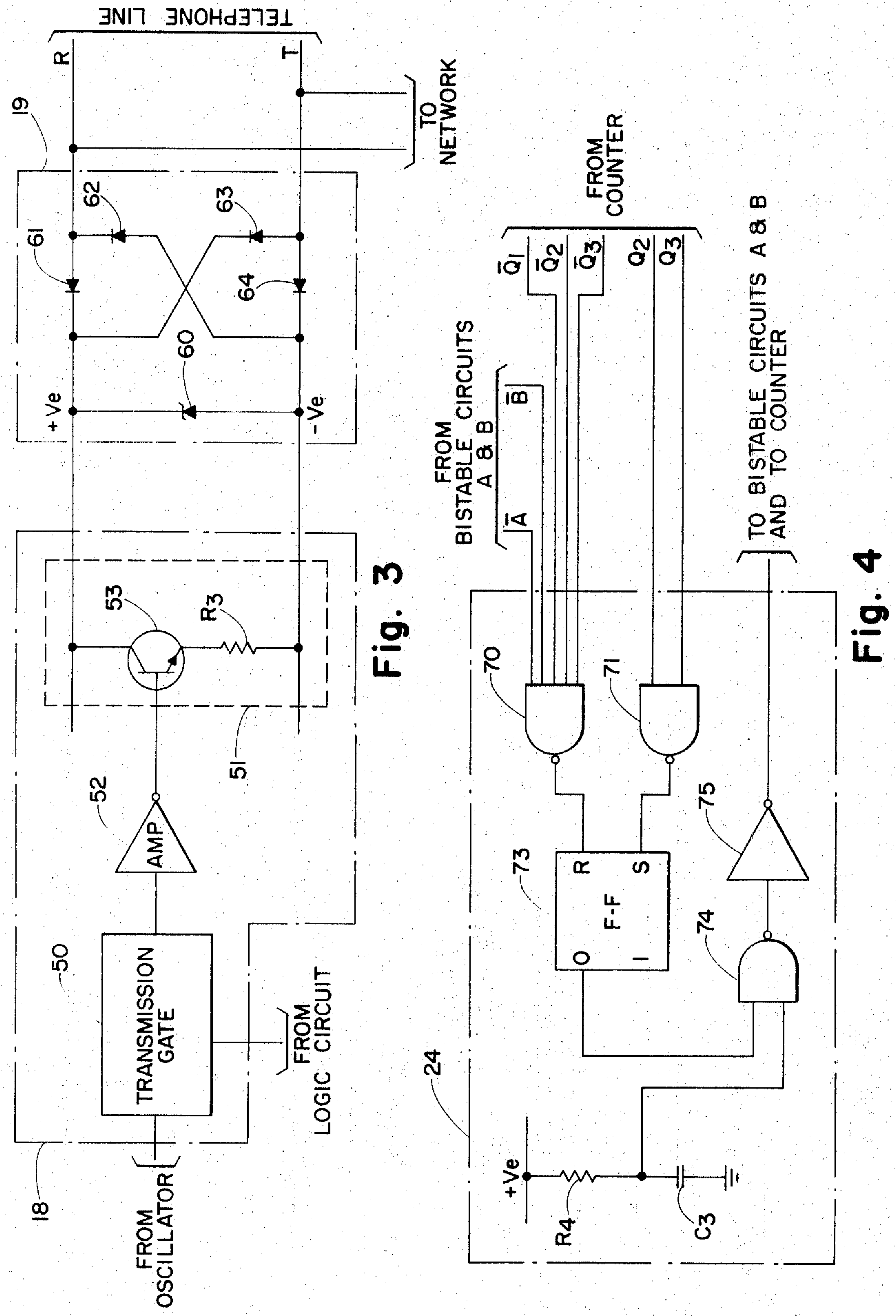
FIG. 3 is a schematic diagram of a second portion of the circuit shown in FIG. 1.
FIG. 4 is a logic diagram of a third portion of the circuit shown in FIG. 1.

FIG. 3 is a circuit diagram of the transmission gating circuit 18 and the protection circuit 19 of FIG. 1. A transmission gate 50 which may be of any suitable type, has a first input connected to the output of the oscillator 17 and a control input connected to the output of logic circuit 20. The output of the transmission gate 50 is connected to line driver circuit 51 through an amplifier 52. Line driver 51 consists of a transistor 53 having its collector connected to one side of the telephone line through a resistor $R_3$. This transistor configuration is that of an emitter- follower and serves to modulate the loop line current in accordance with the signal appearing on its base. As discussed later this signal is in the form of alternating current signal bursts.

The protection circuit 19 comprises a zener diode 60 which provides overvoltage protection, and a diode bridge consisting of diodes 61, 62, 63 and 64. Diodes 61 to 64 constitute a bridge to guard against polarity reversal on the telephone line thereby insuring that the same voltage polarity is always applied to the electronic circuitry of the coin signalling circuit.

FIG. 4 is a logic diagram of the reset circuit 24 shown in FIG. 1. A pair of gates 70 and 71 have their inputs logically connected to the outputs of bistable cicuits A and B (FIG. 1) and of the counter circuits 30, 31 and 32 (FIG. 2). The output of gate 70 is connected to the reset input of flip flop 73 and the output of gate 71 is connected to the set input thereof. The 0 output of flip flop 73 is connected to a first input of NAND gate 74 whose output is connected through inverter 75 to the reset inputs of bistable circuits A and B and counter circuits 30, 31 and 32. A second input of gate 74 is connected to the junction of a resistor $R_4$ having its outer end connected to one side of the power supply and a capacitor $C_3$ connected to ground.

The operation of the reset circuitry is as follows. When a subscriber goes off-hook, power is applied to the $R_4$–$C_3$ circuit. Before the junction of $R_4$ and $C_3$ reaches the threshold level of gate 74, the latter is ON and a pulse is generated at the output of inverter 75 to reset bistable circuits A and B and counter circuits 30, 31 and 32. This pulse is illustrated as the second waveform in FIG. 5 (RESET - initialization).

A reset pulse is also required at the end of each coin cycle. This is obtained by gate 71 whose inputs sense a predetermined logical condition in logical circuit 20 and sets flip flop 73 which causes a reset condition at the output of inverter 75. When gate 70 senses that the reset function has been completed, flip flop 73 is reset thereby and the reset condition is removed from the output of inverter 75. This reset function is identified in FIG. 5 as RESET - internal.

OPERATION OF THE CIRCUIT

The operation of the circuit will now be described in conjunction with FIGS. 1 to 5. When the subscriber goes off-hook, power is applied to the signalling circuit. As described above, a reset-initialization pulse (FIG. 5) causes bistable circuits A and B and the circuits 30, 31 and 32 of the counter to be reset.

Figure 5:
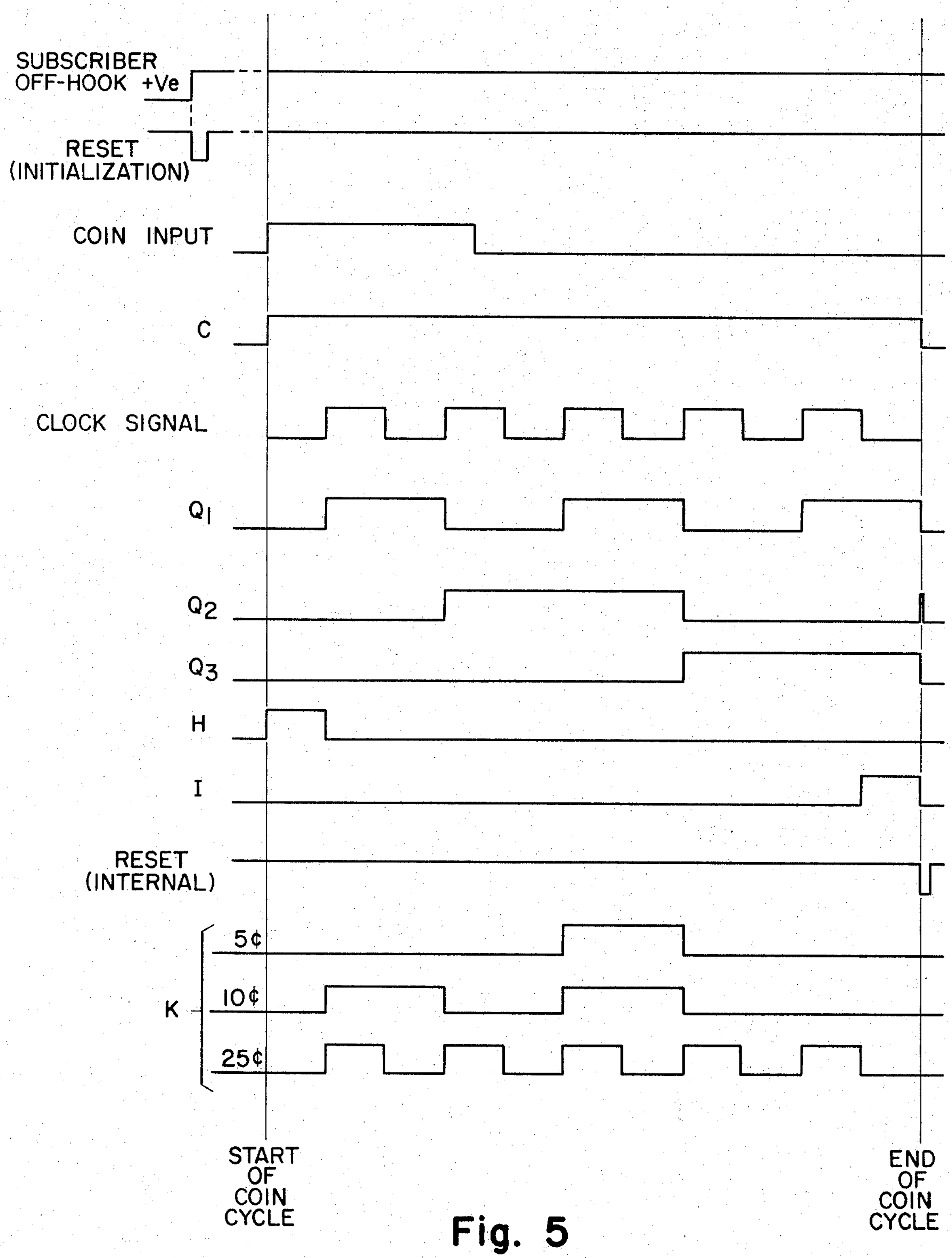
FIG. 5 is a waveform diagram illustrating the signals which may be observed at different points in the circuits of FIGS. 1 to 4.

Let use now assume that the subscriber inserts a coin of a predetermined denomination into the coin sorter 14. One of the coin switches 13 is actuated by the coin and selectively sets one or both of bistable circuits A and B, thereby starting the coin cycle (FIG. 5). Bistable circuits A and B provide output signals on lead A–A and B–B. The gating means 15 now allows the pulse generator 16 and the oscillator 17 to function normally. The clock signals from the pulse generator 16 drive the counter of logic circuit 20 which provides output signals on leads $Q_1$–$\overline{Q_1}$, $Q_2$–$\overline{Q_2}$ and $Q_3$–$\overline{Q_3}$. Gate 37 (FIG. 2) turns ON and produces output signal H which causes transistor 39 to turn ON, thereby energizing the LC winding and causing the muting relay to latch. The MR make-contact (FIG. 1) operates, thereby muting the receiver of subset 12. Then, the gates 33 to 36 respond to the signals from the counter and the bistable circuits A and B to provide an output signal K. As illustrated in FIG. 5, signal K comprises a predetermined number of pulses, the number of pulses being representative of the coin inserted into the telephone subset. It should be noted that since the output K is a digital signal coded to represent the denomination of a coin, it is ideally suited as an input signal to a variable initial rate circuit which one may wish to use in conjunction with a coin telephone signalling circuit.

The output signal K is applied to the transmission gating circuit 18 which is enabled thereby and allows bursts of alternating current signals from the oscillator 17 to be transmitted on the telephone line. Of course, the number of bursts corresponds to the number of pulses contained in the signal K and therefore represents the denomination of the coin inserted into the telephone subset. It may be observed at this point that the standard telephone subset hybrid network is connected in parallel with the coin signalling circuit, thereby making use of the equalization characteristics of the network in the transmission of the coded coin signal. Also, since the power required by the signalling circuit is derived from the telephone line, the network performs as a voltage regulator.

After the coded coin signal has been transmitted on the telephone line, gate 38 produces output signal I which causes transistor 40 to turn ON and the ULC winding to be energized, thereby unlatching the muting relay. The MR contact returns to its normal position and the receiver 22 is unmuted. At the end of output signal I, the reset circuit 24 produces a reset-internal signal to reset the counter stages 30, 31 and 32 and bistable circuits A and B after which it resets itself as described above. The coin signalling circuit is now ready to receive the next coin.

What is claimed is:

1. An electronic signalling circuit for a coin telephone subset comprising:

a pair of bistable circuits;

switch means responsive to the insertion of a coin into the telephone subset for selectively triggering said bistable circuits;

a pulse generator for producing a clock signal of a predetermined frequency;

an oscillator for producing an alternating current signal of a predetermined audio frequency;

switching means responsive to the outputs of said bistable circuits for controlling the operation of said generator and said oscillator;

a first logical circuit responsive to said clock signal and to the outputs of the bistable circuits for producing an output signal comprising a predetermined number of pulses, the number of pulses being representative of the coin inserted into the telephone subset;

transmission gating means responsive to said output signal for gating said alternating current signal to the telephone line whereby alternating current signal bursts are transmitted on the telephone line, the number of bursts being representative of the coin inserted into the telephone subset.

2. A coin signalling circuit as defined in claim 1 wherein said first logical unit comprises:

a binary counter driven by the clock signal from said generator;

a plurality of gates logically connected to the outputs of said bistable circuits and to said counter for producing said output signal.

3. A signalling circuit as defined in claim 2 further comprising:

a second logical circuit responsive to the outputs from said binary counter and to said clock signal for muting the receiver of the telephone subset for the duration of said output signal.

4. A signalling circuit as defined in claim 3 wherein said second logical circuit comprises:

a first gate logically connected to said counter for producing a muting signal before the start of said output signal;

a second gate logically connected to said counter for producing an unmuting signal after said output signal;

a latching reed relay including a latching coil, an unlatching coil, and a relay contact operable in response to the relay energization for disabling the receiver;

first and second capactive discharge circuits for energizing the latching and unlatching coils in response to said muting and unmuting signals respectively.

5. A signalling circuit as defined in claim 4 wherein each of said capacitive discharge circuits comprises:

a transistor having its base connected to the output of one of said first and second gates, its emitter connected to one power supply terminal, and its collector connected to the other power supply terminal through one of said coils and a resistance element, the junction of the coil and the resistance element being connected to said one power supply terminal through a capacitor.

6. An electronic coin signalling circuit as defined in claim 1 wherein said transmission gating means comprises:

a transmission gate responsive to said output signal and to said alternating current signal for producing alternating current signal bursts, the number of bursts being representative of the coin inserted into the telephone subset; and a line driver circuit for applying said signal bursts to the telephone line.

7. A coin signalling circuit as defined in claim 6 wherein the line driver is connected across the telephone line and in parallel with the hybrid network of the telephone subset, whereby the transmitted signal bursts are equalized by the network in a manner similar to that for normal voice transmission.

8. A coin signalling circuit as defined in claim 7 wherein said line driver circuit comprises a transistor having a base electrode to which said signal bursts are applied, an emitter electrode connected through a resistance element to one side of the telephone line and a collector electrode connected to the other side of the telephone line, whereby said transistor acts like an emitter follower to modulate the telephone line loop current in accordance with said signal bursts.

* * * * *